United States Patent
Salhov et al.

(10) Patent No.: US 9,231,797 B2
(45) Date of Patent: Jan. 5, 2016

(54) DYNAMIC THRESHOLD DETECTOR

(75) Inventors: Moshe Salhov, Herzelia (IL); Aviv Salamon, Ra'anana (IL)

(73) Assignee: GO NET SYSTEMS LTD., Tel Aviv (IL)

(*) Notice: Subject to any disclaimer, the term of this patent is extended or adjusted under 35 U.S.C. 154(b) by 2443 days.

(21) Appl. No.: 11/946,062

(22) Filed: Nov. 28, 2007

(65) Prior Publication Data

US 2009/0135954 A1 May 28, 2009

(51) Int. Cl.
*H04L 27/06* (2006.01)
*H04L 25/06* (2006.01)
*H04B 7/08* (2006.01)

(52) U.S. Cl.
CPC .............. *H04L 25/061* (2013.01); *H04B 7/086* (2013.01); *H04B 7/0802* (2013.01); *H04B 7/0805* (2013.01)

(58) Field of Classification Search
CPC .... H04B 7/086; H04B 7/0802; H04B 7/0805; H04L 25/061
USPC .................. 375/260, 316, 340, 347, 349–350
See application file for complete search history.

(56) References Cited

U.S. PATENT DOCUMENTS

| | | | | |
|---|---|---|---|---|
| 4,930,140 A | * | 5/1990 | Cripps et al. | 370/342 |
| 6,724,834 B2 | | 4/2004 | Garrett et al. | |
| 6,772,100 B2 | | 8/2004 | Lipp | |
| 6,882,681 B2 | * | 4/2005 | Sano | 375/148 |
| 6,901,062 B2 | | 5/2005 | Scherzer et al. | |
| 7,103,116 B2 | | 9/2006 | Thompson et al. | |
| 7,126,533 B2 | | 10/2006 | Fiore et al. | |
| 7,826,807 B2 | * | 11/2010 | Laroia et al. | 455/102 |
| 2004/0228424 A1 | | 11/2004 | Baldwin et al. | |
| 2005/0130687 A1 | | 6/2005 | Filipovic et al. | |
| 2006/0133544 A1 | * | 6/2006 | Kawada et al. | 375/343 |
| 2006/0209932 A1 | * | 9/2006 | Khandekar et al. | 375/148 |
| 2007/0116158 A1 | | 5/2007 | Guo et al. | |
| 2007/0224942 A1 | * | 9/2007 | Kuramoto et al. | 455/67.11 |

* cited by examiner

*Primary Examiner* — Sophia Vlahos
(74) *Attorney, Agent, or Firm* — Professional Patent Solutions; Vladimir Sherman (57) ABSTRACT

A burst detector featuring a dynamic threshold that is calculated according to the detection efficiency while operating in a noisy environment. In one embodiment, signals from various directions are multiplied by appropriate weights, wherein the weights are a function of the FAR, the throughput, and/or various modem indications.

5 Claims, 9 Drawing Sheets

DYNAMIC THRESHOLD DETECTOR

BACKGROUND

Basic principles and details relating to detectors featuring a dynamic threshold needed for properly understanding the present invention are provided herein. Complete theoretical descriptions, details, explanations, examples, and applications of telecommunication receivers, related subjects, and implementations are readily available in standard references from the fields of telecommunication, signal detection, and spatial scanning.

BRIEF SUMMARY

Embodiments of the present invention disclose a burst detector featuring a dynamic threshold that is calculated according to the detection efficiency while operating in a noisy environment. In one embodiment, signals from various directions are multiplied by appropriate weights, wherein the weights are a function of the False Alarm Rate (FAR), the throughput, and/or various modem indications.

DETAILED DESCRIPTION

In the following description, numerous specific details are set forth. It should be understood, however, that the embodiments of the invention may be practiced without these specific details. In other instances, well-known hardware, software, materials, structures and techniques have not been shown in detail so as not to obscure this description. In this description, references to "one embodiment" or "an embodiment" mean that the feature being referred to is included in at least one embodiment of the invention. Moreover, separate references to "one embodiment" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the embodiments described herein. Also herein, flow diagrams illustrate non-limiting embodiment examples of the methods, and block diagrams illustrate non-limiting embodiment examples of the devices.

Some flow diagrams operations are described with reference to the embodiments illustrated by the block diagrams. It should be understood, however, that the methods of the flow diagrams could be performed by embodiments of the invention other than those discussed with reference to the block diagrams, and embodiments discussed with reference to the block diagrams could perform operations different than those discussed with reference to the flow diagrams. Moreover, it should be understood that although the flow diagrams may depict serial operations, certain embodiments could perform certain operations in parallel and/or in different orders than those depicted.

Figure 1A:
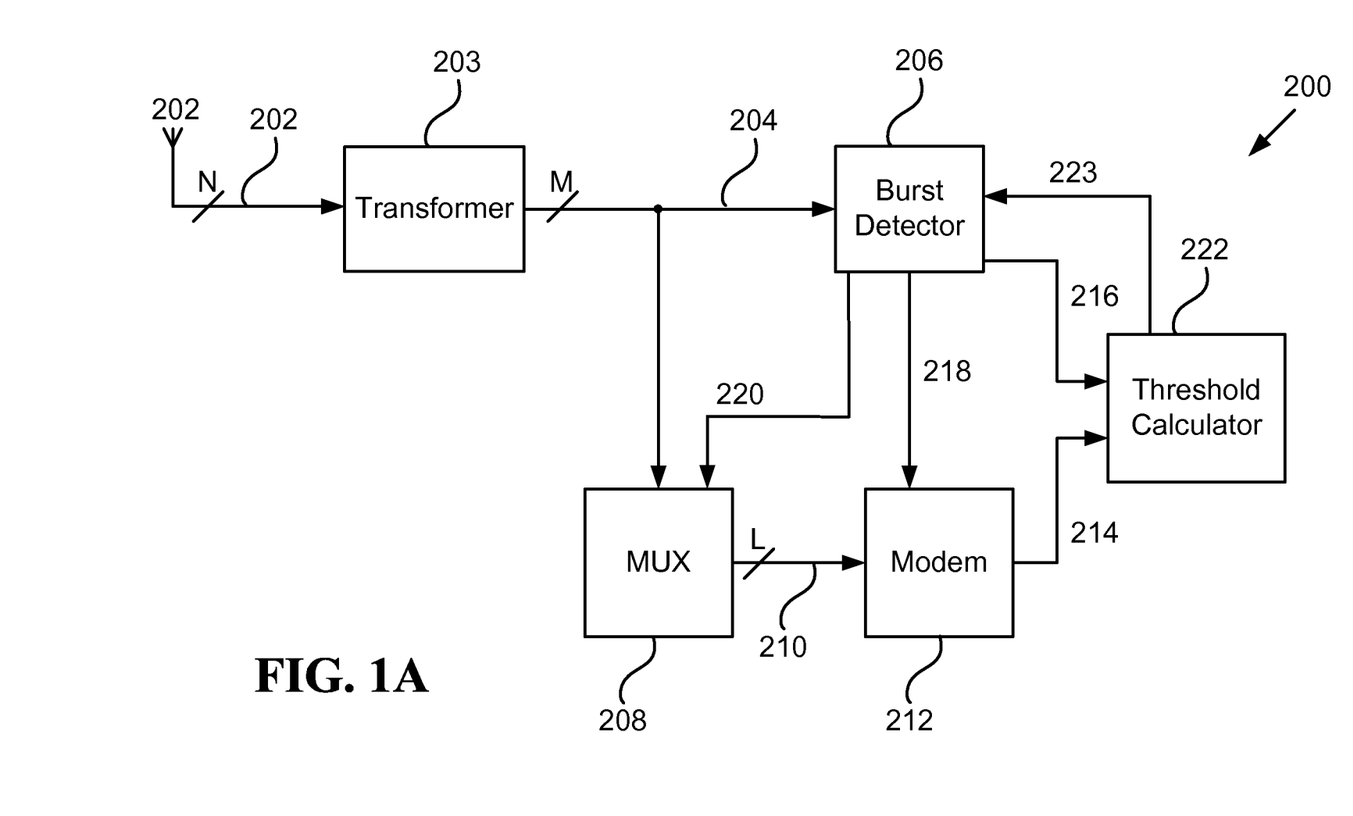
FIG. 1A is schematic block diagram of a dynamic threshold receiver, in accordance with one embodiment of the present invention.

Referring now to the drawings, FIG. 1A illustrates one embodiment of a receiver 200 that includes a burst detector featuring a dynamic threshold. The receiver 200 comprises the following elements: 'N' antennas 202, a signal transformer 203, a burst detector 206, a multiplexer 208, a modem 212, and a threshold calculator 222.

The signal transformer 203 transforms the received inputs 202 from the antennas' domain to a predetermined domain. The signal transformer 203 may apply one or more of the following operations on the input signals:
  (i) multiplication by a steering vector,
  (ii) transformation using a fast Fourier transform (FFT) or a discrete Fourier transform (DFT),
  (iii) transformation that includes filtering through a filter bank, and
  (iv) multiplication by a predefined weight matrix.

In one embodiment, the signal transformer 203 outputs 'M' signals 204, which are received by the burst detector 206. The burst detector 206:
  (i) determines whether the received transmissions contain packets, and
  (ii) determines the signals, or a subset of the signals, to be forwarded to the modem 212.

In one embodiment, when the burst detector 206 determines that a packet and/or a burst exists, the burst detector 206 signals the modem 212 about an expected signal using connection 218, and signals the multiplexer 208 about the signal(s) to be forwarded to the modem 212 using a connection 220. In one embodiment, the burst detector 206 is implemented as a correlation detector or as an energy detector. The burst detector 206 includes at least one dynamic threshold. Optionally, the dynamic threshold is a function of the detection quality and is calculated by the threshold calculator 222.

In one embodiment, the burst detector 206 forwards to the threshold calculator 222, using connection 216, one or more of the following information:
  (i) the threshold that was used for the current detection;
  (ii) the detection type, such as: correlation, energy, signal power, or spatial power based detection, as illustrated below; and
  (iii) the corresponding value of the selected detection type, such as the energetic or
  correlative value that passed the detection threshold. The higher the value, the more
  significant the signal.

In one embodiment, one or more of the following detection types is utilized for checking whether it is likely that at least one required signal is received by the antenna:
  (i) Correlating the signals received from at least one predefined direction with a predefined correlation pattern. Examples of predefined correlation patterns include, but are not limited to, a training sequence, a preamble defined by the communication protocol or standard, or autocorrelation when the signal features a repetitive pattern. Whenever the correlation result exceeds a predefined threshold, in a predefined direction, it is likely that a required signal is being received from the appropriate predefined direction at the detection time (plus some constant processing delay time). Therefore, when the correlation result exceeds a predefined threshold, the signal is identified as a potentially required signal.

(ii) Detecting the power of the input signal. Whenever the power of the input signal exceeds a predefined threshold, it is likely that a required signal is being received from the appropriate predefined direction. Therefore, when the power detection result exceeds a predefined threshold, the signal is identified as a potentially required signal.

(iii) Detecting the spatial power of the input signal. Signals featuring spatial power that is stronger than a predefined threshold are identified as a potentially required signals.

(iv) Correlating only one signal received from only one antenna by using a correlator featuring a predefined correlation pattern. The correlation result is then power-detected. Whenever the power exceeds a predefined threshold it is likely that a required signal is received by the antenna.

The modem 212 demodulates 'L' signals 210 received from the multiplexer 208, wherein (1≤L≤N). Optionally, the demodulated signal (not shown in the figure) is used by the system. In one embodiment, the modem 212 forwards to the threshold calculator 222, using connection 214, one or more of the following information:

(i) The existence of a successful demodulation of a number of symbols;

(ii) The average constellation variance. Wherein the constellation comprises the set of signals that are transmitted through the communication channel and the constellation variance represents a measure of the instantaneous noise.

(iii) The duration of the demodulation. The longer the demodulation duration, the higher the chances that a required signal is being received. The shorter the demodulation duration, the lower the chances that a required signal is being received. Optionally, the modem 212 reports whether the modulation duration is above or below a predefined threshold.

(iv) Proper Cyclic Redundancy Check (CRC). When available, a proper CRC indicates that the demodulation ended successfully.

(v) Any demodulation failure after the detection. Examples of demodulation failures include, but are not limited to, unavailability of an expected preamble, or information loss by the modem such that the demodulation cannot continue.

In one embodiment, the threshold calculator 222 receives the above described information from the burst detector 206 and/or the modem 212 and performs one or more of the following calculations in order to set the dynamic threshold of the detector (using connection 223):

(i) Calculating the detection quality of each detection threshold. One example of a detection quality calculation is calculating the relation between the number of positive events and the number of negative events, measured in the same time interval; where the positive events include successful demodulation, modulation duration above a threshold, and proper CRC; and the negative events include modulation duration below a threshold, and a demodulation failure after the detection.

(ii) Calculating the quality of the information rate per each detection threshold. One example of calculating the quality of the information rate per each detection threshold is calculating the relation between the number of positive events multiplied by the information rate per information event divided by the number of negative events. Another example of calculating the quality of the information rate per each detection threshold is calculating the relation between the total number of demodulated information bits resulted from each detector detection and the number of false alarms per corresponding detector, measured at the same time interval. Still another example of calculating the quality of the information rate per each detection threshold is calculating the relation between the average number of demodulated information bits resulted from the detector detections and the average number of false alarms of that detector.

Figure 1B:
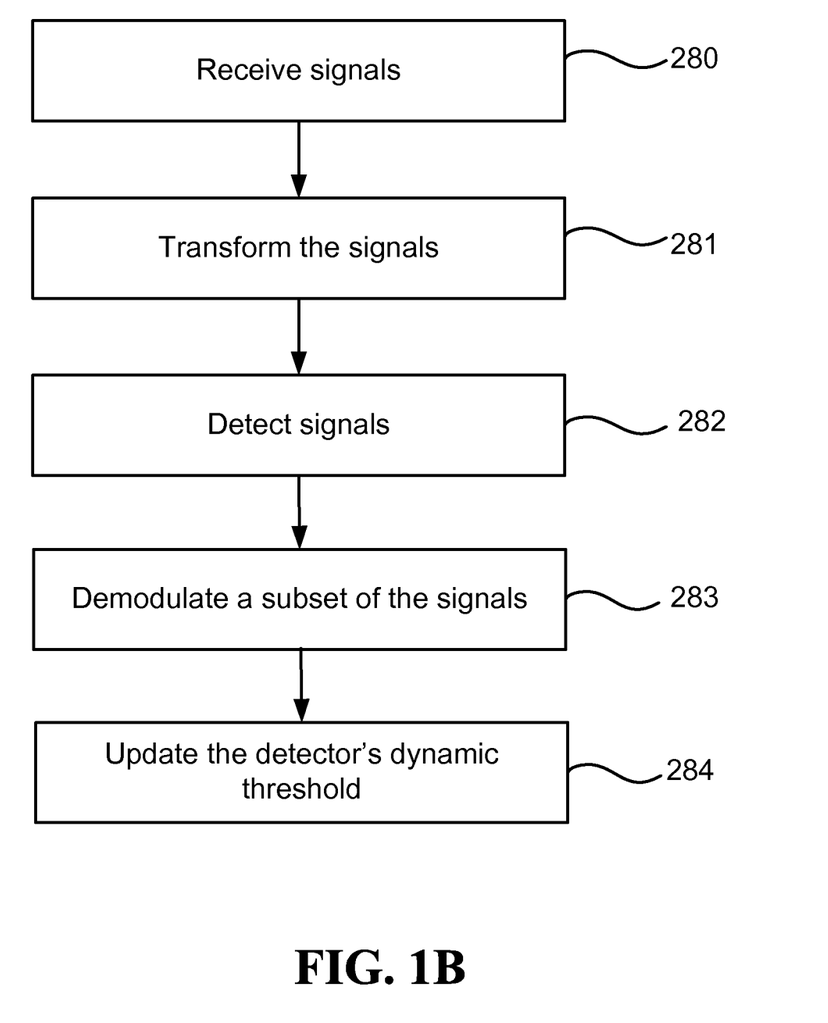
FIG. 1B is a flow diagram illustrating one method in accordance with one embodiment of the present invention.

FIG. 1B is a flow diagram illustrating one method comprising the following steps: in step 280, receiving at least two signals; in step 281, transforming the signals to a predefined domain; in step 282, detecting the signals using a detector comprising at least one dynamic threshold; in step 283, demodulating a subset of the signals; and in step 284, updating the detector's dynamic threshold using information from the detection step and the demodulation step.

Figure 2:
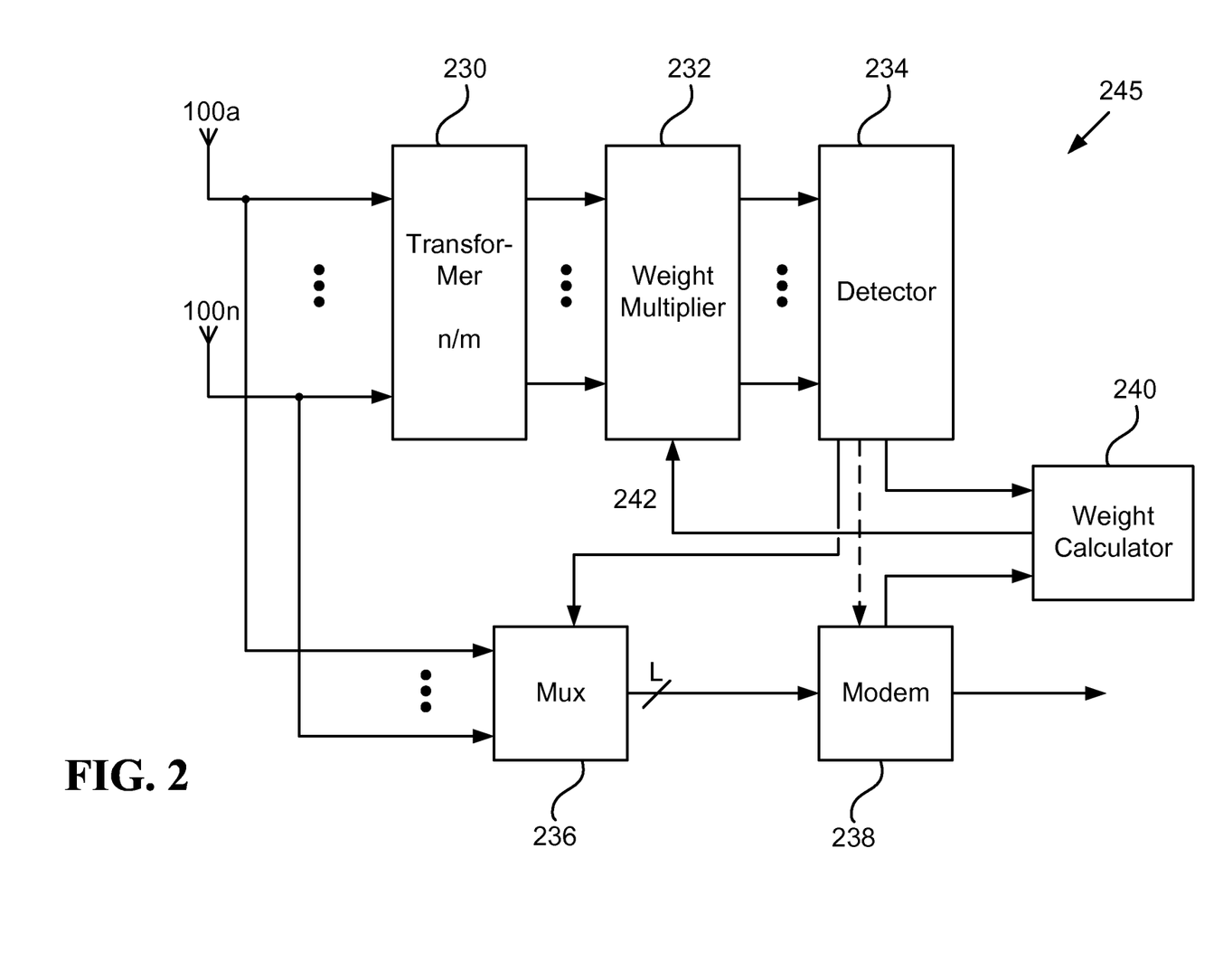
FIG. 2 is a schematic block diagram of a dynamic weight receiver, in accordance with one embodiment of the present invention.

FIG. 2 illustrates one embodiment of a receiver 245 that includes a detector featuring dynamic weights. The receiver 245 comprises the following elements: 'n' antennas 100a-100n, a transformer 230 from the antenna domain to another predetermined domain, a weight multiplier 232, a detector 234, a multiplexer 236, a modem 238, and a weight calculator 240. The weight calculator 240 calculates the weights (used by the weight multiplier 232) and updates (using connection 242) the weight multiplier 232.

Figure 3:
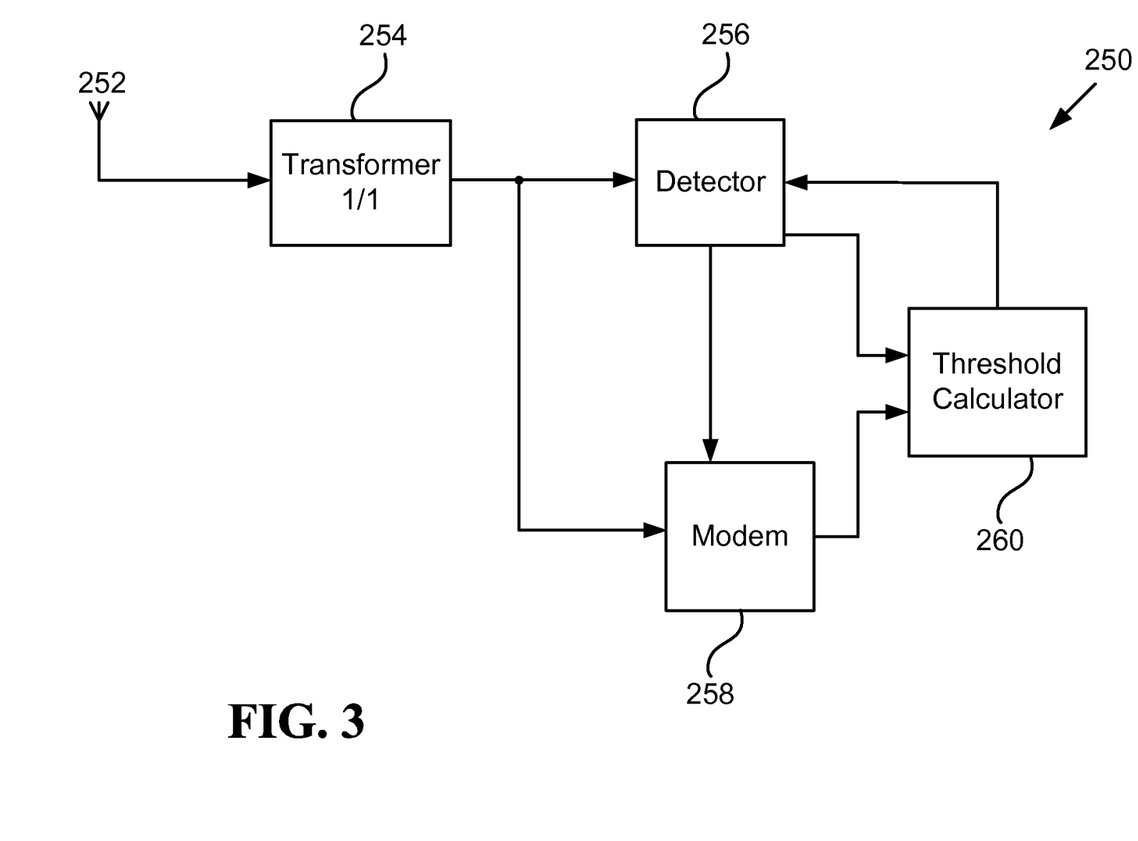
FIG. 3 is a schematic block diagram of a one-dimensional dynamic threshold receiver, in accordance with one embodiment of the present invention.

FIG. 3 illustrates one embodiment of a one-dimensional receiver 250 that includes a detector featuring a dynamic threshold. The receiver 250 comprises the following elements: an antenna 252, a transformer 254 from the antenna domain to another predetermined domain, a detector 256 comprising a dynamic threshold, a modem 258, and a threshold calculator 260. The threshold calculator 260 calculates the dynamic threshold used by the detector 256. The dynamic threshold is calculated using at least one of the dynamic threshold methods disclosed herein.

Figure 4:
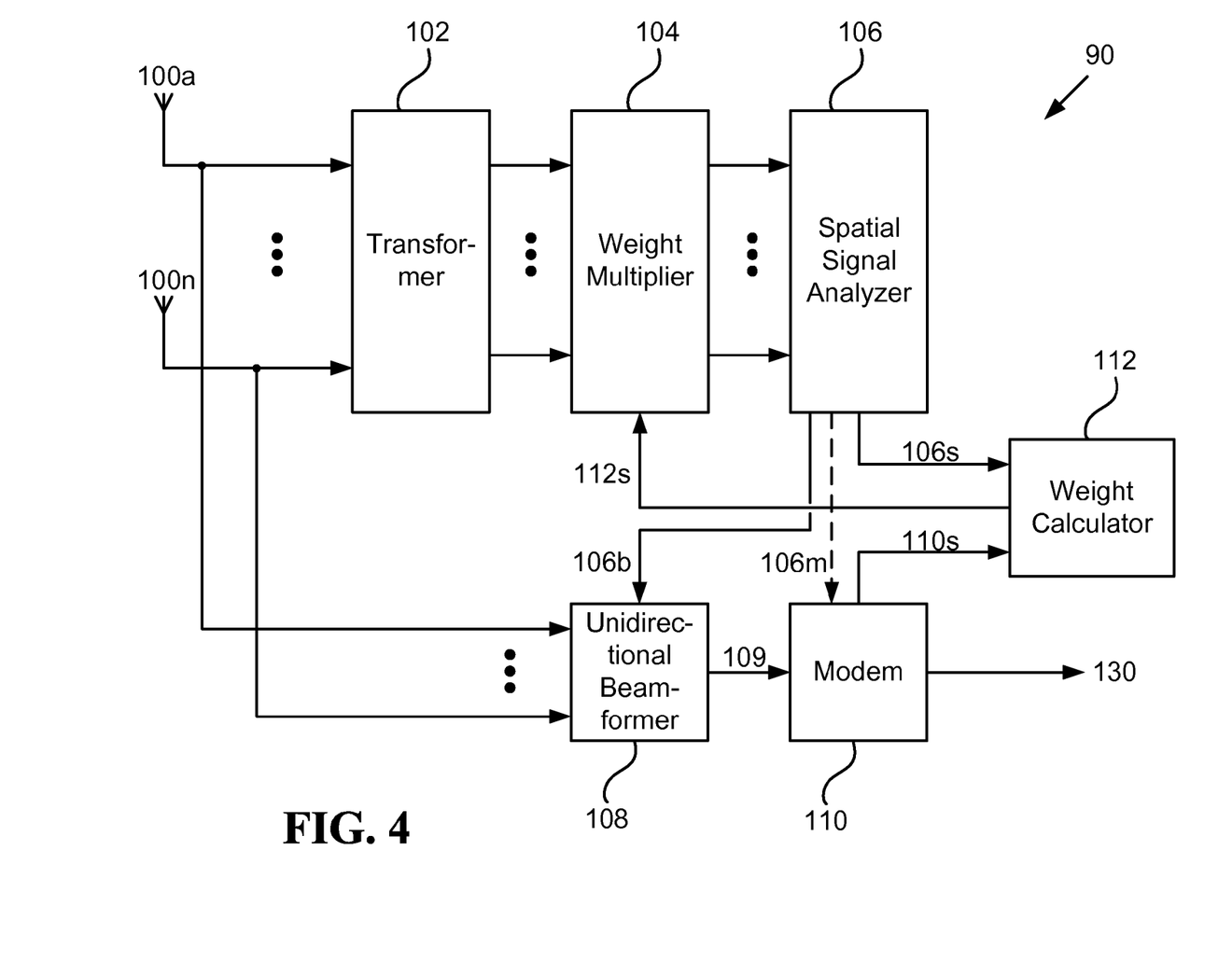
FIG. 4 is a schematic block diagram of a receiver, in accordance with one embodiment of the present invention.

FIG. 4 illustrates one embodiment of a receiver 90 in accordance with the present invention. The receiver 90 may comprise the following elements: at least two antennas (100a-100n), a signal transformer 102, a weight multiplier 104, a spatial signal analyzer 106 array detector, a unidirectional beamformer 108, and a modem 110. Optionally, the receiver 90 also includes a weight calculator 112. Optionally, the signal analyzer 106 is a detector that receives 'n' inputs and determines whether there are relevant signals or not.

The at least two antennas (100a-100n) may feature approximately the same characteristics and/or different characteristics according to a specific need. The at least two antennas may be an integral part of the receiver 90 or may be connected to the receiver 90 using an input signals interface (not shown in the figures). Optionally, the input signals interface may be a standard antenna interface or any appropriate physical interface for receiving the signals from the antennas. In one embodiment, the signal transformer 102 transforms the signals from the antenna space to the spatial space.

The weight multiplier 104 multiplies each spatial space signal by its appropriate weight 112s, which is provided by the weight calculator 112. In one embodiment, the weight multiplier 104 may be implemented as part of the signal transformer 102 and/or as part of the spatial signal analyzer 106.

In one embodiment, the spatial signal analyzer 106 detects some or all of the received signals. In another embodiment, the spatial signal analyzer 106 detects some or all of the received signals and estimates the direction of the detected signals. The spatial signal analyzer 106 supplies the weight calculator 112 with an indication of the detection efficiency 106s. Examples of the indication of the detection efficiency include, but are not limited to, False Alarm Rate (FAR) and an indication of each detected false alarm.

In one embodiment, the unidirectional beamformer 108 is connected to the antennas (100a-100n), optionally through a preprocessing element, and extracts one signal from a specific direction of arrival. Optionally, the direction of arrival 106b of the signal to be extracted by the unidirectional beamformer is received from the spatial signal analyzer 106. The signal 109 from the direction of arrival (optionally, 106b) is then forwarded to the modem 110. The modem 110 may supply the weight calculator 112 with appropriate data 110s, such as, but not limited to, the total number of received packets and the average rate of packets reception.

In one embodiment, the modem 110 is operated only when a signal is expected to be received. For example, the spatial signal analyzer 106 may signal the modem 110 about an expected signal using connection 106m. Alternatively, the weight calculator 112 or the unidirectional beamformer 108 may signal the modem 110 about the expected signal.

The weight calculator 112 may be implemented as a discrete element or, optionally, as part of any other processing element. The weight calculator 112 receives the indication of the detection efficiency 106s from the spatial signal analyzer 106 and, optionally, receives data 110s from the modem 110.

Figure 5:
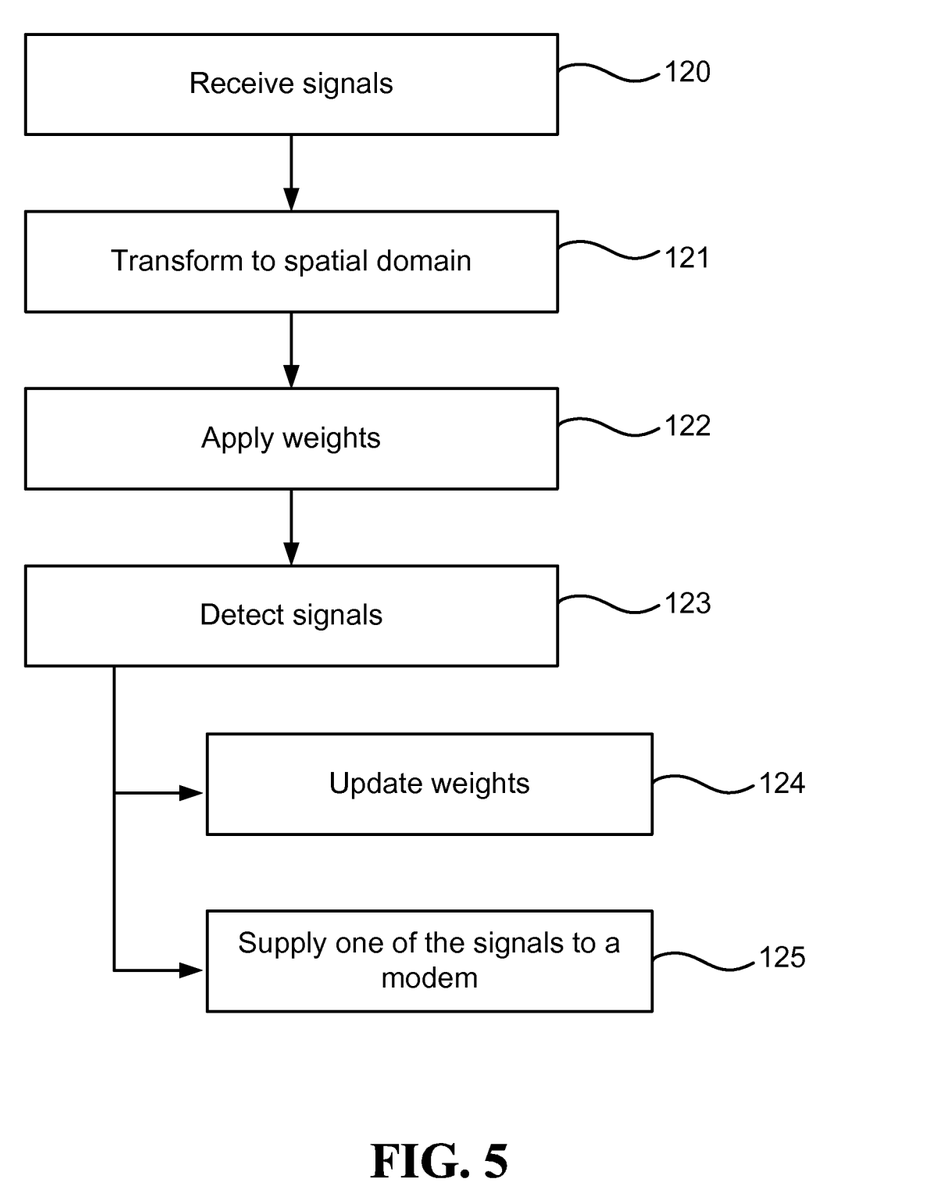
FIG. 5 is a flow diagram illustrating one method in accordance with one embodiment of the present invention.

FIG. 5 is a flow diagram illustrating one method comprising the following steps: in step 120, receiving at least two signals; in step 121, transforming the signals to the spatial domain; in step 122, multiplying the transformed signals by weights; in step 123 detecting the weighted transformed signals; in step 124, updating the weights according to the detection results; and in step 120, supplying, according to the detection results, one of the signals to a modem.

In one embodiment, the weights are calculated as a function of the FAR and the throughput, wherein the FAR and the throughput are functions of the direction 'a'.

$$W(a)=f(FAR(a), throughput(a))$$

For example, the weights may be calculated as the product of multiplying the FAR by the throughput and, optionally, by a coefficient.

In one embodiment, the throughput is calculated by multiplying the channel utilization by the connection access speed. In one embodiment, the FAR is calculated by dividing the number of false alarms received from the detector, by the total number of packets received from the modem. Because the FAR calculation is proportional to the information rate (the traffic), the information rate itself is monitored in addition to the FAR. Optionally, the information rate is monitored by the modem that knows when and how much information passes through it.

In one embodiment, the weights 112s are a function of one or more of the following:
(i) the calculated efficiency of the detector and/or the information rate;
(ii) a priori knowledge, such as an RF check; and
(iii) input received from a mechanism detecting directional interference (e.g. data about a
directional interference, such as a wireless device).

In one embodiment, the weight calculator 112 receives the data 106s from the spatial signal analyzer 106 and the data 110s from the modem 110, synchronized. The synchronization between these two inputs may be a function of the hardware, such that each detection may be matched with an output from the modem.

In one embodiment, the weights are selected in order to correct the antenna distortions, such as, but not limited to, inaccurate calibration, the characteristics of the antenna, and coupling between the antenna elements and any other physical element.

In one embodiment, the weights are predefined according to a priori knowledge. Examples of a priori knowledge include, but are not limited to, RF review, site survey and arbitrary selection. The a priori knowledge may be useful for reducing interference from a specific direction without changing the hardware.

In one embodiment, signal detection and direction of arrival estimation are performed based on applying the weights designed to identify both the existence and direction of arrival of a required signal featuring known characteristics.

Figure 6:
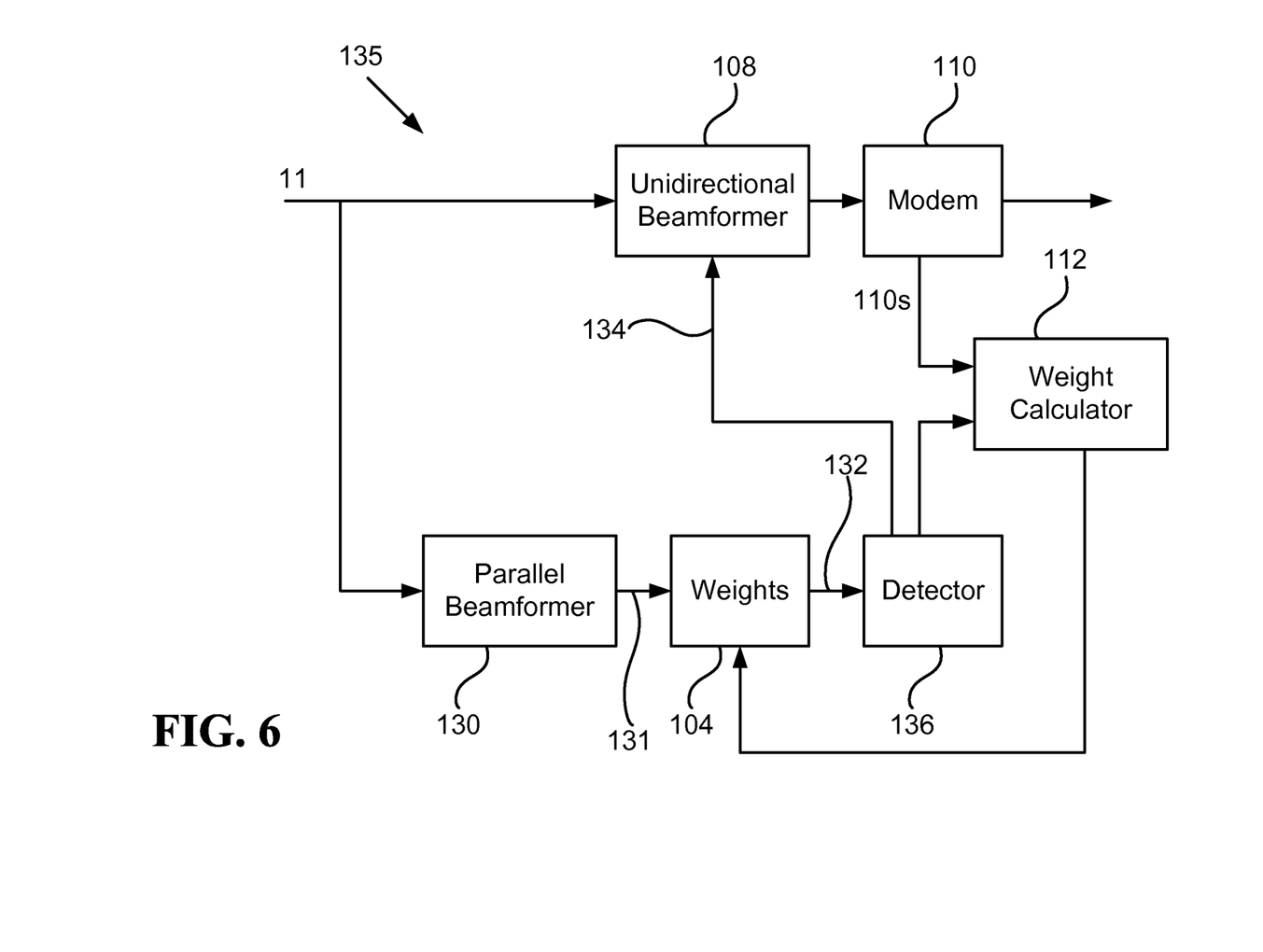
FIG. 6 is a schematic block diagram of a receiver, in accordance with one embodiment of the present invention.

FIG. 6 illustrates one embodiment of a receiver 135 comprising the following elements: multi-baseband inputs 11, a parallel multidirectional beamformer 130, a weight multiplier 104, a detector 136, a weight calculator 112, a unidirectional beamformer 108 and a modem 110. It is to be understood that all the above-described elements are only a schematic illustration of the elements of the embodiment. For example, the parallel multidirectional beamformer 130 and/or the unidirectional beamformer 108 may be coupled to all or some of the baseband inputs 11.

In one embodiment, the multi-baseband inputs 11 are processed in the digital domain, after down-conversion from RF to baseband frequency, filtering, and sampling by an analog-to-digital device.

In one embodiment, the beamforming is achieved by multiplying the received input signals with predefined beamforming weights. Optionally, the beamforming weights are implemented by using Inverse Fast Fourier Transform (IFFT) or matrix vector multiplication. Optionally, the beamforming to all predefined directions is implemented in parallel. Optionally, the parallel multidirectional beamformer 130 features short word length (i.e. low resolution or low dynamic range), in order to reduce hardware requirements; the low dynamic range should be selected in such a way that it is enough for checking whether it is likely that at least one required signal is received by the antenna array.

Signals 131, from the beamformer, are multiplied by weights received from the weight calculator 112 in the weight multiplier 104. Thereafter, signals 132 are detected by the detector 136 in order to check whether it is likely that at least one required signal is being received by the antenna array.

In one embodiment, the parallel multidirectional beamforming is calculated using a low dynamic range in order to reduce hardware requirements. A low dynamic range may be implemented by a short word-length calculation. In this case, the identified potentially required signal is obtained by the unidirectional beamformer 108, using improved dynamic range beamforming, before it is forwarded to the modem 110. Alternatively, the signal may be forwarded to the modem without an additional calculation featuring an improved dynamic range.

In one embodiment, the unidirectional beamformer 108 receives at least two baseband inputs 11 and one angle of arrival 134 of the identified potentially required signal from the detector 136. Optionally, the unidirectional beamforming 108 is a "delay and sum" beamforming that multiplies the received input signal by predefined weights. Thereafter, the unidirectional beamforming output is forwarded to a modem 110. As explained above, all signals that do not have the required characteristics are filtered out before they are forwarded to the modem 110. As a result, the modem 110 detects only the identified potentially required signals; therefore the number of calculations required to be performed by the modem 110 is drastically reduced.

Figure 7:
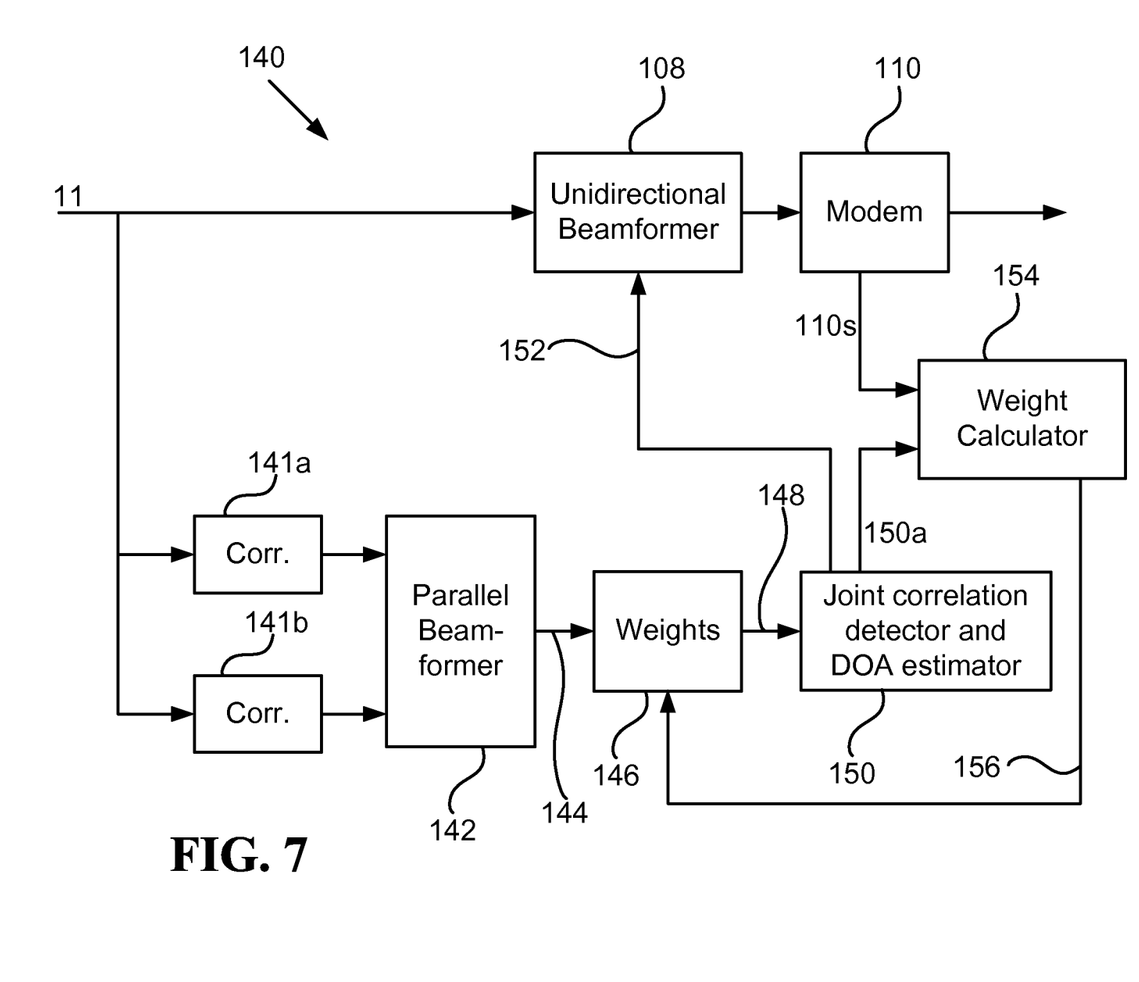
FIG. 7 is a schematic block diagram of a receiver, in accordance with one embodiment of the present invention.

FIG. 7 illustrates one embodiment of a receiver 140 comprising the following elements: at least two correlators 141a and 141b, a parallel multidirectional beamformer 142, a weight multiplier 104, a joint correlation detector and direction of arrival (DOA) estimator 150, a weight calculator 154, a unidirectional beamformer 108, and a modem 110. The joint correlation detector and DOA estimator 150 may also be referred to as a time and space detector. It is to be understood that all the above-described elements are only schematic illustrations of elements useful for this embodiment. For example, the elements may be connected either to each baseband input or to pre-selected inputs, i.e. elements 141a, 141b, 142, 146 and 150 may be applied to all or some of the baseband input signals 11. Moreover, each correlator (141a and 141b) may represent an array of correlators connected to each one of the baseband inputs 11. Moreover, the parallel multidirectional beamformer 142 may represent an element that separately performs beamforming on each of the correlator inputs.

Figure 8:
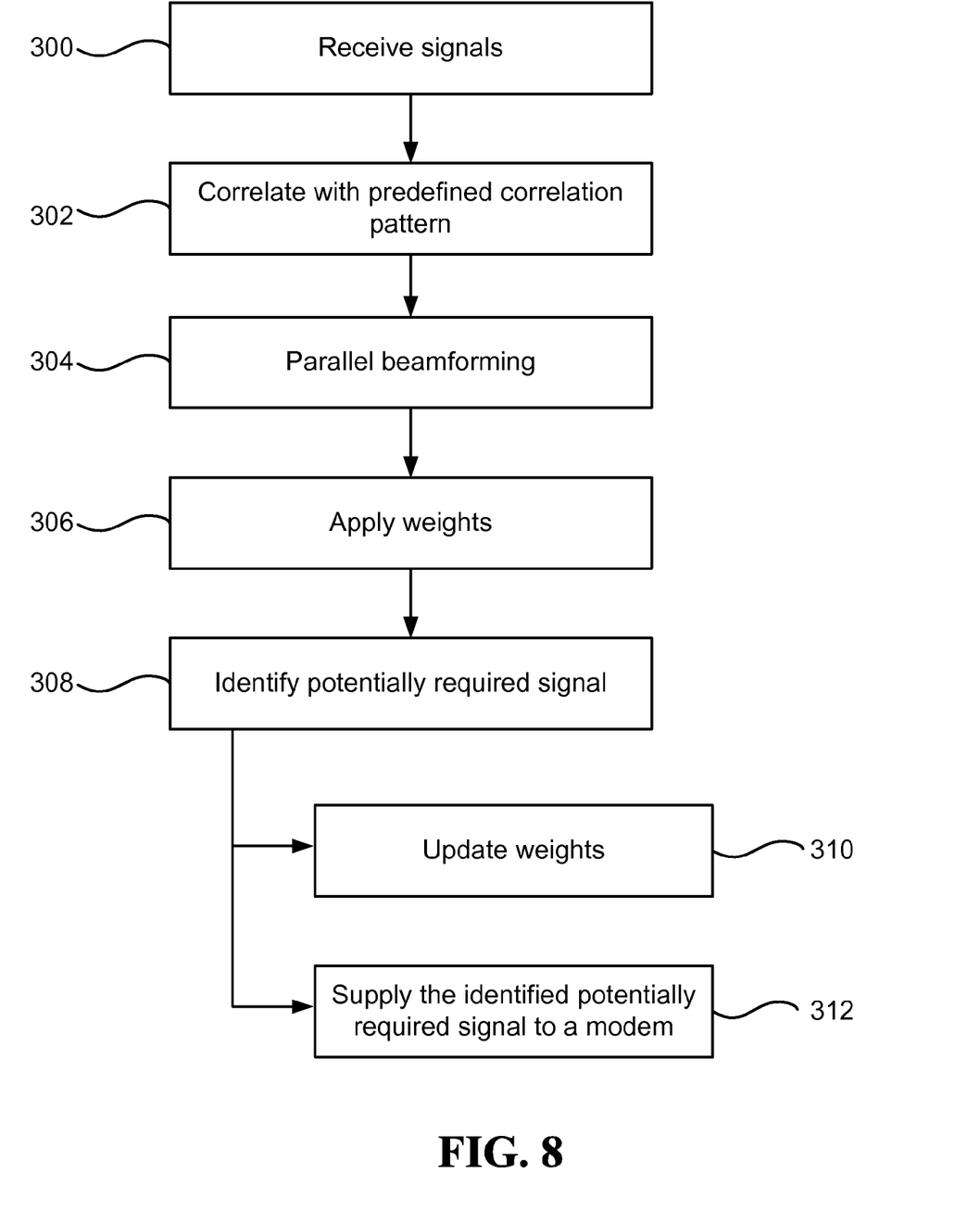
FIG. 8 is a flow diagram illustrating one method in accordance with one embodiment of the present invention.

FIG. 8 is a flow diagram illustrating one method comprising the following steps. In step 300, receiving at least two baseband input signals 11 from an antenna array. The input signals may be processed in the digital domain, after down-conversion from RF to baseband frequency, filtering, and sampling by an analog-to-digital device. In step 302, correlating at least one of the baseband input signals 11 with at least one predefined correlation pattern. In one embodiment, there are at least two correlators (141a, 141b), featuring different predefined patterns, i.e. each correlator identifies a different type of signal. Optionally, each type of correlator is applied to all baseband input signals 11. In one embodiment, the baseband input signals 11 may be preprocessed by correlators having the same correlation pattern as correlators 141a and 141b.

In step 304, beamforming the correlated signals using a parallel multidirectional beamformer 142. The parallel multidirectional beamformer 142 extracts signals received from at least one predefined direction. Optionally, the beamforming is implemented by using IFFT or by matrix vector multiplication. Optionally, the beamforming to all predefined directions is implemented in parallel. Optionally, the parallel multidirectional beamforming 142 is calculated with a low dynamic range.

In step 306, applying weights 156 to signals 144. Optionally, the weights 156 are applied using the weight multiplier 146 that receives the weights 156 from a weight calculator 154. In one embodiment, the weights are utilized for attenuating the signals received from direction(s) of unwanted interfering signal(s), and as a result avoiding interference by avoiding repetitively detecting the same direction of arrival of an unwanted interfering signal(s).

In step 308, detecting correlation between the predefined pattern and the received signals and estimating direction of arrival for identifying the potentially required signal. Optionally, detecting the correlation and estimating the direction of arrival are implemented in a joint correlation detector and DOA estimator 150 that identifies the direction of arrival of a signal that may feature required information. The signal that may feature the required information is forwarded to the modem 110. In one embodiment, whenever the calculation results following beamforming are above a predefined threshold, it is most likely that the signal from the appropriate direction is a required signal and therefore it is identified as a potentially required signal.

As described above, in one embodiment, there are at least two correlators (141a and 141b) featuring different predefined patterns, i.e. each correlator identifies a different type of signal. All outputs of the at least two correlators are beamformed in parallel. Then, when a required signal is received, only one correlator should feature the result of a correlation above a predefined threshold.

In step 310, updating the weights 156. The joint correlation detector and DOA estimator 150 indicate the detection efficiency 150a to the weight calculator 154. Examples of indicating the detection efficiency include, but are not limited to, False Alarm Rate (FAR) and an indication of each detected false alarm. The modem 110 may supply the weight calculator 112 appropriate data 110s, such as, but not limited to, the total number of received packets and/or the average rate of packet reception. Optionally, the weights are a function of the FAR and the throughput, wherein the FAR and the throughput are functions of the direction. The weight calculator 154 may be implemented as a discrete element or, optionally, as part of any other processing element. In one embodiment, the weight calculator 154 receives the data 150a and 110s in a synchronized manner; the synchronization between these two inputs may be a function of the hardware, such that each detection may be matched with an output from the modem.

In step 312, forwarding the identified potentially required signal to a modem 110. Optionally, the joint correlation detector and DOA estimator 150 forwards the angle of the identified potentially required signal to the unidirectional beamformer 108 that is extracting the identified potentially required signal before it is forwarded to the modem 110. In one embodiment, the weight calculator 154 and/or the joint correlation detector and DOA estimator 150 may notify the modem 110 about an expected signal. Optionally, when no signal is expected, the modem 110 is in a low power consumption state.

It is to be understood that the disclosed embodiments may be implemented with more than one modem 110 and may thereby handle multiple signals in parallel, as long as the number of detected signals does not exceed the number of available modems.

It is to be understood that beamformers 108, 130 and 142 may all be the same beamformer without affecting the scope of the embodiments. The joint correlation detector and DOA estimator 150 may forward to the beamformer and/or to the weight calculator other data that is different from the angles of the potentially required signal, such as the data passed from the detector to the weight calculator.

The above-described methods may vary in many ways, such as changing the order of method steps, and/or performing a plurality of steps concurrently. Moreover, the weights may be utilized for attenuating the signals received from unwanted interfering directions, while still receiving the wanted signals from those directions.

Although the embodiments of the present invention have been described in considerable detail with reference to certain embodiments thereof, other embodiments are possible. Therefore, the spirit and scope of the appended claims should not be limited to the description of the embodiments contained herein.

It is appreciated that certain features of the embodiments, which are, for clarity, described in the context of separate embodiments, may also be provided in various combinations in a single embodiment. Conversely, various features of the embodiments, which are, for brevity, described in the context of a single embodiment, may also be provided separately or in any suitable sub-combination.

It is to be understood that the embodiments are not limited in their applications to the details of the order or sequence of steps of operation of methods, or to details of implementation of devices, set in the description, drawings, or examples.

Moreover, the individual blocks illustrated in the block diagrams herein may be functional in nature and do not necessarily correspond to discrete hardware elements.

While the methods disclosed herein have been described and shown with reference to particular steps performed in a particular order, it will be understood that these steps may be combined, sub-divided, or reordered to form an equivalent methods without departing from the teachings of the embodiments of the present invention. Accordingly, unless specifically indicated herein, the order and grouping of the steps is not a limitation of the embodiments of the present invention.

Any citation or identification of any reference in this application shall not be construed as an admission that such reference is available as prior art to the embodiments of the present invention.

While the embodiments have been described in conjunction with specific examples thereof, it is to be understood that they have been presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A receiver comprising:
    a set of antennas adapted to receive signals;
    signal processing circuitry functionally associated with said set of antennas and adapted to perform direction based isolation of signals received by said antennas from any of one or more processing circuitry defined directions, wherein said direction based isolation employs a first set of functional parameters of which one or more parameters is specific to a defined direction being isolated;
    a detector functionally associated with said signal processing circuitry and adapted to generate a demodulation trigger upon detection of one or more signal characteristics indicative of a data packet being present within a given isolated signal, which isolated signal is associated with a given direction, and wherein said detection at least partially employs a parameter from a second set of functional parameters, which second set of parameters are specifically associated with the given direction;
    demodulating circuitry adapted to demodulate the given isolated signal in response to the demodulation trigger from said detector; and
    control logic adapted to adjust a first parameter from either the first or second sets of parameters, which first parameter is associated with the given direction, wherein the adjustment is at least partially based on a detection efficiency value associated with one or more isolated signals received from the given direction.

2. The receiver according to claim 1, wherein a failure to demodulate the given isolated signal negatively affects a detection efficiency value associated with the direction from which the given signal was received.

3. The receiver according to claim 1, wherein said signal processing circuitry comprises a signal transformer and a weight multiplier, whereby the weight multiplier multiplies signals received from the signal transformer by weights set within a weight calculator portion of said control logic.

4. The receiver according to claim 1, wherein said detector is selected from the group of detectors consisting of: a burst detector, a spatial signal analyzer, a joint signal detector and direction of arrival estimator.

5. The receiver according to claim 3, wherein said signal transformer is a parallel beamformer and said receiver further comprises a multiplexer.

* * * * *